Patented Jan. 19, 1926.

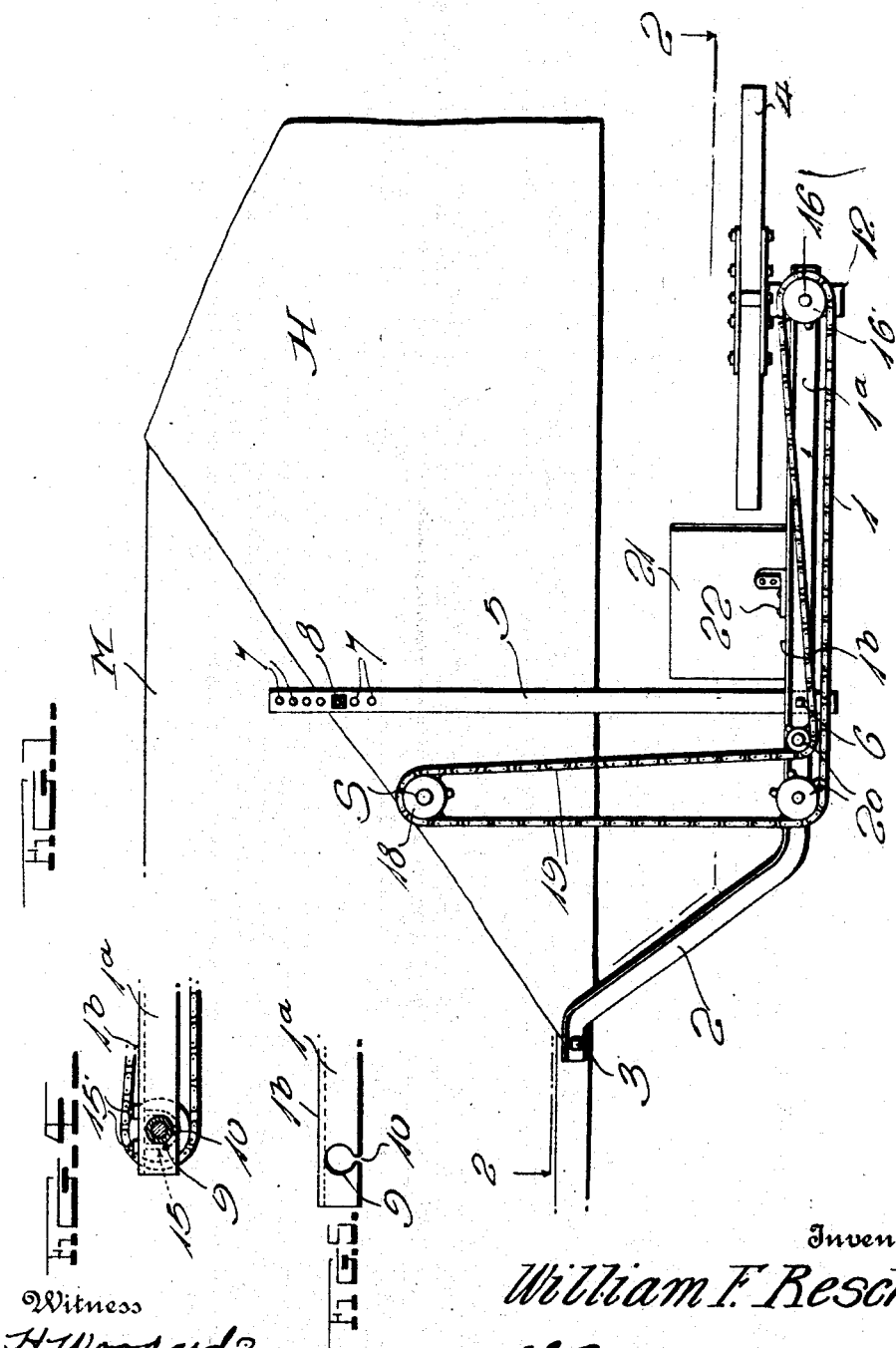

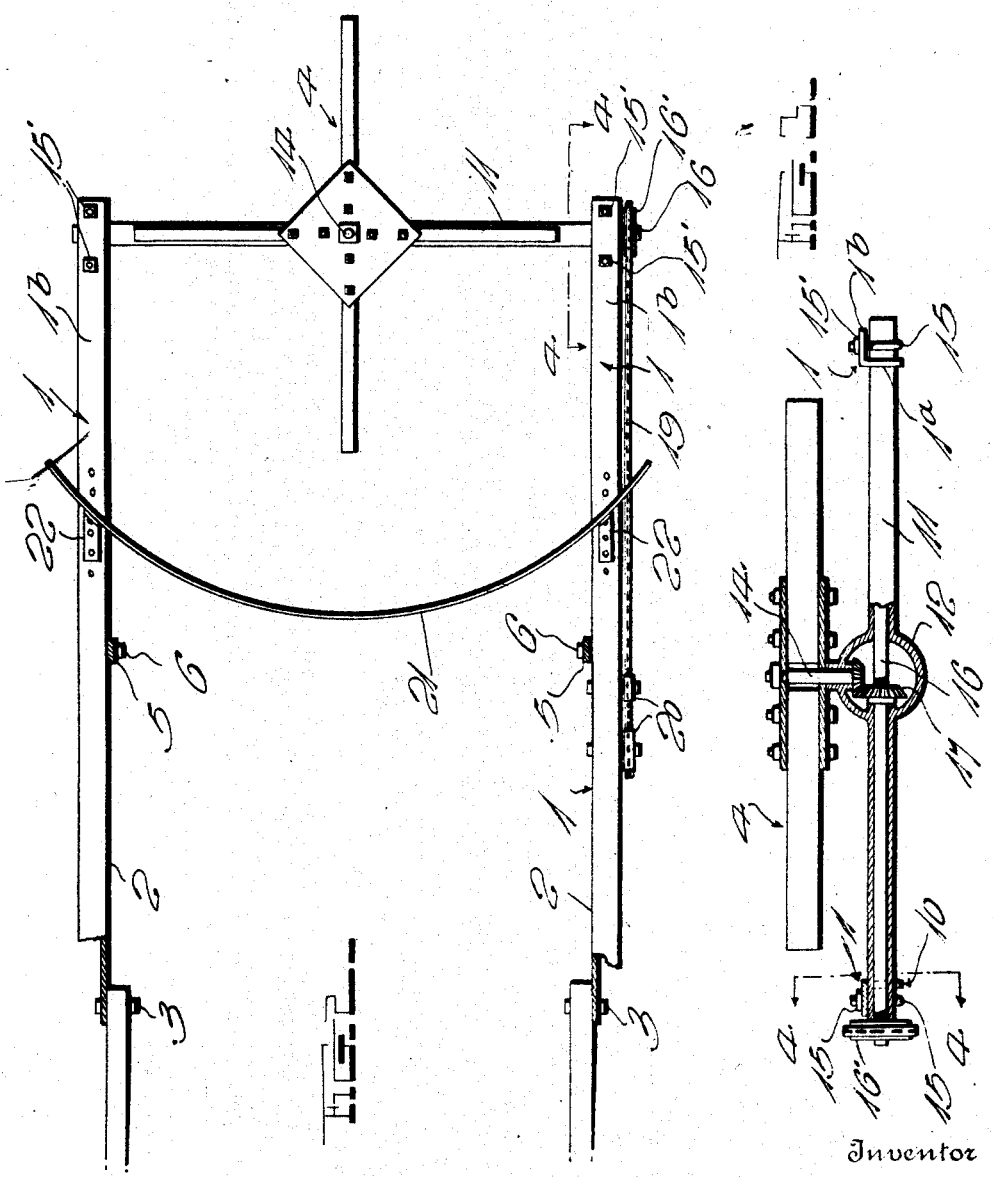

1,569,882

UNITED STATES PATENT OFFICE.

WILLIAM F. RESCHKE, OF WICHITA, KANSAS, ASSIGNOR TO INTERNATIONAL HARVESTER COMPANY, OF CHICAGO, ILLINOIS, A CORPORATION OF NEW JERSEY.

STRAW-SPREADING ATTACHMENT.

Application filed September 5, 1922. Serial No. 586,371.

*To all whom it may concern:*

Be it known that I, WILLIAM F. RESCHKE, a citizen of the United States, residing at Wichita, in the county of Sedgwick and State of Kansas, have invented certain new and useful Improvements in Straw-Spreading Attachments; and I do declare the following to be a full, clear, and exact description of the invention, such as will enable others skilled in the art to which it appertains to make and use the same.

My invention relates to improvements in spreading machines and has reference primarily to attachments for combined harvesting and threshing machines, intended to spread the straw discharged therefrom, evenly over the ground, as the machine travels over the latter.

Combined machines of the character above set forth, project rearwardly to a rather great extent from the rear wheels, with the result that there is very little clearance between the rear end of the machine and the ground, when the rear wheels drop into a rut, gulley or the like. Furthermore, there is very little existing space between the lower side of the machine at its rear end and rocks or other obstructions over which the machine travels. Hence it is one of the principal objects of my invention to mount the frame of my improved straw spreader in such a manner that it may yield vertically in case it should be brought into contact with the ground or with any obstructions, thereby preventing possible injury to any part.

A further object is to provide novel means whereby the rotary straw distributor may be adjusted so that it will operate in a horizontal plane or in any of a number of inclined planes, according to conditions encountered while spreading.

A still further object is to provide a spreading attachment which may be quickly and easily applied to numerous kinds of machines, the construction being of extreme simplicity.

With the foregoing in view, the invention resides in the novel subject matter hereinafter described and claimed, the description being supplemented by the accompanying drawings.

Figure 1 is a side elevation of a portion of the rear of a combined harvesting and threshing machine with my invention applied thereto.

Figure 2 is a horizontal section taken on the line 2—2 of Fig. 1.

Figure 3 is a rear end elevation, parts being shown in section.

Figure 4 is a detail section taken on the line 4—4 of Figs. 2 and 3.

Figure 5 is a detail side elevation of the rear end of one of the side bars of the frame structure.

In the drawings above briefly described, the character M designates the rear portion of a combined harvesting and threshing machine which is provided at its rear extremity with the usual straw discharge hood H and a rear straw kicker shaft S.

My improved attachment includes a pair of horizontal side bars 1 forming part of a frame structure, said bars having their front ends directed upwardly as indicated at 2 and pivoted to the frame of the machine M by bolts or the like 3 so that said bars may swing upwardly and downwardly. The rear ends of the bars 1 carry the straw spreading attachment 4 and in case some associated parts should strike the earth or other obstructions, it is advisable to mount the frame in a manner to permit the same to yield upwardly. Hence, I pivot the bars 1 to the machine and provide spring metal hanger straps 5 in rear of the pivots 3 for limiting downward swing of the bars 1, while permitting these bars to swing upwardly, as the straps will spring or bow during this movement. In the present showing, the straps 5 are pivoted at 6 to the side bars 1 and are provided at their upper ends with a plurality of openings 7 through any of which bolts 8 may be passed after adjusting the bars 1 to the desired height, said bolts having suitable engagement with the sides of the machine M.

Preferably, the side bars 1 are formed of angle metal, each having a vertical flange 1ª with a horizontal flange 1ᵇ at one edge, while horizontally alined openings 9 with which said flanges 1ª are formed, open through the outer edges thereof as indicated by the reference character 10.

A tubular horizontal distrbutor support 11 extends between the rear ends of the side bars 1 and is received turnably in the openings 9, said support being provided with an open yoke-like central portion 12 carrying the vertical drive shaft 14 of the distributer 4. It will be seen that turning of the distributor support 11 in the openings 9 will enable the distributor 4 to be positioned either horizontally or in any of a plurality of inclined planes. For the purpose of clamping the support 11 after the distributor or the like has been adjusted in this manner, I provide U-bolts 15 which straddle said support and pass through the horizontal flanges 1ᵇ. By this arrangement, tightening of the nuts 15′ on the U-bolts will spring the horizontal flanges 1ᵇ and will consequently draw the opposed walls of the openings 9 into binding frictional contact with the support 11, thereby tightly clamping the latter in adjusted position.

A shaft 16 passes through the tubular support 11 and drives the shaft 13 through the instrumentality of appropriate gearing 17 located within the yoke 12. A sprocket wheel 16′ is secured on one end of the shaft 16, another sprocket wheel 18 is secured on the shaft S, a chain 19 is engaged with these two sprocket wheels, and idlers 20 are mounted on one of the side bars 1 to guide the chain. By this arrangement rotation of the kicker shaft S will cause rotation of the distributor 4 so that the straw will be distributed as it is fed out of the hood H.

In connection with the features above described, I prefer to provide an arcuate shield 21 mounted on the side bars 1 and adjustable toward and from the distributor 4, by any preferred means 22.

As excellent results have been obtained from the details disclosed, I prefer to follow these details, but it is to be understood that within the scope of the invention as claimed, numerous minor changes may be made.

I claim:

1. A straw spreading attachment for harvester threshers comprising a frame having side bars mounted on the rear end of the harvester thresher for pivotal movement about a horizontal axis, a rotatable distributer carried on a transverse shaft mounted between said side bars, means on said side bars adjacent the shaft whereby said distributer may be tilted in a plurality of planes on the axis of said shaft transverse to the line of travel of the machine, the same means adapted for clamping said distributer in any of such tilted positions.

2. A straw spreading attachment for harvester threshers comprising a frame having side bars mounted for pivotal movement on the rear end of the harvester thresher, a tubular casing spanning said side bars, an enlarged gear housing intermediate the ends of said casing, a rotatable shaft in said casing, gearing in the gear housing operable by said shaft, a distributer carried by said casing and adapted to be rotated by said shaft and gearing, means carried by said side bars whereby said casing may be rotated to tilt the distributer at an angle to the horizontal, the same means adapted for locking said casing in such adjusted position.

3. In a straw spreading attachment for harvester threshers, the combination of rearwardly extending angle side bars adapted to be mounted on the harvester thresher frame, said bars each having a horizontal flange and a vertical flange, the vertical flanges each having an aperture in alinement with each other, a horizontally disposed distributer beater support having its ends turnably received in said alined openings, and U-bolts straddling said support and passing through the horizontal flanges of the bars for clamping the support in position.

In testimony whereof I have hereunto affixed my signature.

WILLIAM F. RESCHKE.